United States Patent
Brownlee

(10) Patent No.: US 6,292,576 B1
(45) Date of Patent: Sep. 18, 2001

(54) METHOD AND APPARATUS FOR DISTINGUISHING A HUMAN FINGER FROM A REPRODUCTION OF A FINGERPRINT

(75) Inventor: Kenneth Brownlee, Palo Alto, CA (US)

(73) Assignee: Digital Persona, Inc., Redwood City, CA (US)

( * ) Notice: Subject to any disclaimer, the term of this patent is extended or adjusted under 35 U.S.C. 154(b) by 0 days.

(21) Appl. No.: 09/514,964

(22) Filed: Feb. 29, 2000

(51) Int. Cl.[7] .................................................. G06K 9/00
(52) U.S. Cl. ............................ 382/124; 356/71; 340/5.83
(58) Field of Search ................... 382/115–116, 124–127; 356/71; 340/5.82, 5.83

(56) References Cited

U.S. PATENT DOCUMENTS

| | | | |
|---|---|---|---|
| 4,120,585 | * | 10/1978 | DePalma ................................ 356/71 |
| 5,088,817 | * | 2/1992 | Igaki et al. ............................ 382/125 |
| 5,737,439 | * | 4/1998 | Lapsley et al. ....................... 382/115 |
| 5,953,441 | * | 9/1999 | Setlak .................................... 382/124 |
| 5,982,914 | * | 11/1999 | Lee et al. .............................. 382/125 |
| 5,990,804 | * | 11/1999 | Koyama ................................ 382/127 |
| 6,064,753 | * | 5/2000 | Bolle et al. ........................... 382/126 |
| 6,144,757 | * | 11/2000 | Fukuzumi ............................. 382/124 |
| 6,175,641 | * | 1/2001 | Kallo et al. ........................... 382/124 |
| 6,181,808 | * | 1/2001 | Fukuzumi ............................. 382/126 |

* cited by examiner

Primary Examiner—Bhavesh Mehta
(74) Attorney, Agent, or Firm—Blakely, Sokoloff, Taylor & Zafman LLP

(57) ABSTRACT

A method and apparatus for distinguishing a human finger from a reproduction of a fingerprint. A finger is placed on a transparent platen having a prism or microprism array attached. A first light source directs light to the platen, the first light positioned to show illumination in the areas where the skin is in contact with the platen. A first image of the fingerprint is captured by an imaging device when the finger is illuminated by the first light source. A second light source directs light at the platen, the second light positioned to show illumination in the areas where there is no skin contact. A second image of the fingerprint is captured by the imaging device when the finger is illuminated by the second light source. A determination that the fingerprint is from a human finger is made if a mathematical comparison of the two images meets some predetermined criteria.

26 Claims, 7 Drawing Sheets

METHOD AND APPARATUS FOR DISTINGUISHING A HUMAN FINGER FROM A REPRODUCTION OF A FINGERPRINT

FIELD OF THE INVENTION

This invention relates generally to a fingerprint scanning system, and more particularly to a method and apparatus for distinguishing a human finger from a reproduction of a fingerprint.

BACKGROUND OF THE INVENTION

Automatic fingerprint scanners are commonly used to obtain an analog or digital image for security, access, verification, or record-keeping applications. In most conventional scanners, a two-dimensional (2D) image of the fingerprint is captured by an imaging device having a matrix of picture elements or pixels arranged as multiple rows and columns. A 2D light-sensitive electronic sensor, such as a charge-coupled device (CCD), is typically used to capture a fingerprint image.

Fingerprint imaging systems must determine if the image presented is a real finger or an optical or mechanical reproduction of a fingerprint, to deny access when a reproduction is presented. Such reproductions may be in the form of a fingerprint printed on paper, a fingerprint printed on clear or reflective plastic, or may be in the form of a three-dimensional (3D) model of a fingerprint, such as a rubber stamp. In the extreme case, a finger may be removed from its rightful owner and used with the imaging system without the rightful owner being present.

SUMMARY OF THE INVENTION

The present invention provides a method and apparatus for distinguishing a human finger from a reproduction. A finger is placed on a transparent platen having a prism or microprism array attached. A first light source directs light to the platen, the first light positioned to show illumination in the areas where the skin is in contact with the platen. A first image of the fingerprint is captured by an imaging device when the finger is illuminated by the first light source. A second light source directs light at the platen, the second light positioned to show illumination in the areas where there is no skin contact. A second image of the fingerprint is captured by the imaging device when the finger is illuminated by the second light source. A determination that the fingerprint is from a human finger is made if a mathematical comparison of the two images meets a predetermined criteria.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION

In the following description of a fingerprint scanning system, reference is made to the accompanying drawings which form a part hereof, and in which is shown by way of illustration a specific embodiment in which the invention may be practiced. It is to be understood that other embodiments may be utilized and structural changes may be made and changes to the mathematical algorithms may be made without departing from the scope of the present invention. In one embodiment, described below, enables a remote computer system user to execute a software application on a network file server.

In the following description, for purposes of explanation, numerous specific details are set forth in order to provide a thorough understanding of the disclosed technology. It will be evident, however, to one skilled in the art that the disclosed technology may be practiced without these specific details. In other instances, well-known structures and devices are shown in block diagram form in order to facilitate description.

A finger is placed on a transparent platen having a prism or microprism array attached. A first light source directs light to the platen, the first light positioned to show illumination in the areas where the skin is in contact with the platen. A first image of the fingerprint is captured by an imaging device when the finger is illuminated by the first light source. A second light source directs light at the platen, the second light positioned to show illumination in the areas where there is no skin contact. A second image of the fingerprint is captured by the imaging device when the finger is illuminated by the second light source. A determination that the fingerprint is from a human finger is made if a mathematical comparison of the two images meets some predetermined criteria. For one embodiment, this system is used as a threshold determination point for permitting access to a system, area, data, or something else secured by a fingerprint. If the fingerprint is found to be a fake finger, the user is not permitted access. For one embodiment, after the determination that a fingerprint is from a human finger, the fingerprint is further processed to determine whether the owner of the fingerprint is authorized to access whatever is secured by the fingerprint. If the owner is authorized, access is permitted. However, if a fake finger is detected, access is denied. For one embodiment, the system may be closed down entirely if a false finger is detected, and an authority may be alerted that someone is attempting to spoof the system. For one embodiment, the system may alert an authority of the location of the attempted spoof, to discover who the unauthorized user is.

Figure 1:
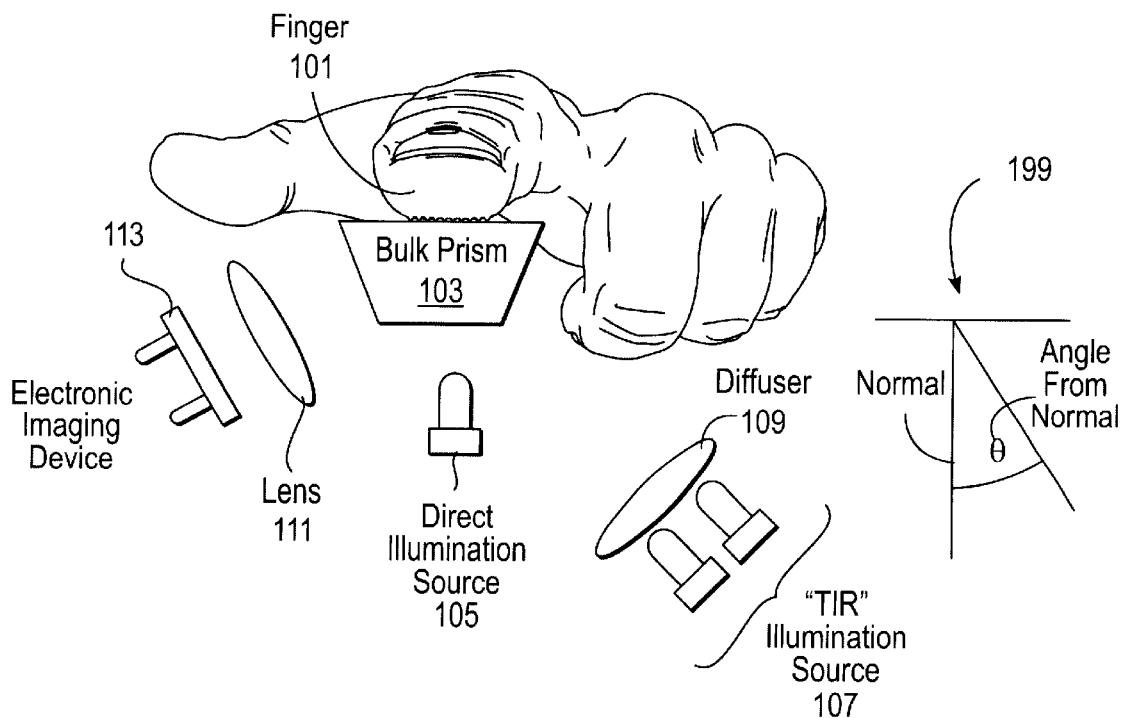
FIG. 1 shows an embodiment of a fingerprint scanning system.

FIG. 1 shows an embodiment of the fingerprint scanning system. A finger 101 is placed on a transparent platen 103 providing a surface for contact with the finger 101. A first light source 105 directs light substantially orthogonal through the platen 103 to illuminate the finger 101. A second light source 107 directs light at an oblique or acute angle to the platen 103. Angle measurement convention 199 shows the normal with respect to the angle convention, as well as the angle from normal, θ. The first light source 105 is directed substantially along the normal. The second light source 107 has an angle from normal between the critical angle and 90 degrees. The critical angle is typically 42 degrees for a glass or plastic platen.

An optional diffuser 109 may be placed between the second light source 107 and the platen 103 to diffuse the light from the second light source 107. Light directed through or at the platen 103 is focused onto an electronic imaging device 113. An optional focusing device 111 may be used to focus light onto the imaging device 113. The platen 103 may preferably be glass or plastic, but it will be recognized by one of ordinary skill in the art that the platen 103 may be constructed of other materials so long as the platen 103 is substantially transparent to the wavelength(s) of light generated by the first light source 105 and second light source 107.

Either the first light source 105 or the second light source 107 may preferably be one or more light emitting diodes (LEDs), but it will be recognized by one of ordinary skill in the art that other light sources may be used with the system, including ambient room light, without loss of generality. The focusing device 111 may preferably be a lens, but it will be recognized by one of ordinary skill in the art that other focusing devices, such as a fiber optic device, curved mirror, or hologram may be used without loss of generality. The imaging device 113 may preferably be a charge-coupled device (CCD), but it will be recognized by one of ordinary skill in the art that other imaging devices, such as a complementary metal-oxide semiconductor (CMOS) sensor or a contact image sensor (CIS), may be used without loss of generality.

Figure 2:
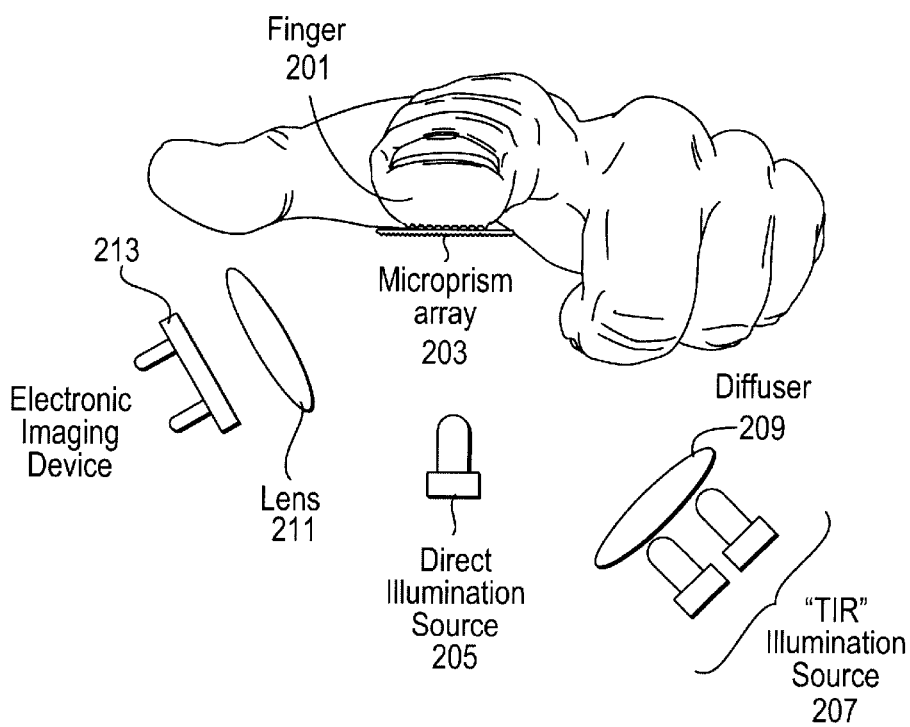
FIG. 2 shows another embodiment of a fingerprint scanning system.

As shown in FIG. 1, in one embodiment, the platen 103 may incorporate a bulk prism. FIG. 2 shows another embodiment, in which the platen 203 incorporates a microprism. It will be recognized by one of ordinary skill in the art that other embodiments using variations in the optics may be used without loss of generality. For example, the platen may take the form of a transparent roller, or may incorporate a hologram.

In another embodiment, a direct light source may be positioned to direct light horizontally into the platen or prism. A direct light source may also be positioned illuminate the flesh of the fingertip external to the platen or prism. In this case, internal scattering of light by blood and skin cells yields a positive image through the platen or prism. It will be recognized by one of ordinary skill in the art that additional or alternative lenses, mirrors, prisms, polarizers, diffractors or other optical elements may be inserted into the light path as needed in order to change focal lengths, improve image contrast, color or brightness, differentiate between materials presented on the platen or prism, or otherwise accommodate a wide range of electronic imaging devices and light sources.

In the embodiments shown in FIG. 1 and FIG. 2, the imaging device is positioned to capture light that is scattered or reflected from the platen surface at an angle greater than the critical angle.

For one embodiment, two different light sources are used. The first light source 105, 205 may illuminate a fingerprint directly, and the second light source 205, 207 may illuminate the fingerprint using frustrated total internal reflection (FTIR). The resulting images obtained using each light source individually, or by superimposing both, are different when a true finger is placed on the platen from a reproduction of a fingerprint. The light sources 105, 107, 205, 207 may generate light of any color in the visible spectrum, or may also generate light or electromagnetic radiation in the infrared or ultraviolet spectrum.

With the system described above, a human finger typically yields a positive image under direct illumination and a negative image under FTIR illumination. Positive is taken to mean that relatively more light is recorded in parts of the image where the raised finger ridges are in contact with the platen, and relatively less light is recorded in parts of the image corresponding to spaces between the finger ridges. Most reproductions of fingerprints typically do not yield such strongly reversed images under the two types of illumination.

The two light sources may be operated sequentially and electronic image processing used to measure the difference between the images. Alternatively, the two light sources may be operated simultaneously, in which the image of a true finger will tend to be canceled out, but the image of a reproduction of a fingerprint will tend to be reinforced. This method can typically distinguish a rubber stamp of a fingerprint because the level of absorption and/or reflectivity of the rubber material does not match the absorption and/or reflectivity of human skin. In addition, this method may be used to determine the authenticity of other human body parts including, but not limited to, hands, feet, parts of the eye, and entire faces.

In the embodiment shown in FIGS. 1 and 2, direct light source 105, 205 illuminates the platen area in such a manner that little or none of the light enters the imaging device if no object is on the platen. If, however, a finger or diffuse reflecting material is in contact with the platen, a portion of the light is scattered back into the prism 103 at an angle greater than the critical angle. For one embodiment, when an imaging device 113 is positioned at an angle greater than the critical angle to the platen surface it receives a positive image of the fingerprint, where the ridges of the fingerprint are light and the background or valleys of the fingerprint are dark.

Conversely, the prism 103 or 203 may be illuminated by light source 107 where much of the light is incident on the surface at greater than the critical angle, and therefore the light is totally internally reflected toward the electronic imaging device 113, 213. The captured image will consequently be light in all areas except those where something is in contact with the surface. If a finger 101, 201 is placed on the surface, the imaging device 113, 213 can capture a negative image, where the ridges of the fingerprint are relatively dark and the background of the fingerprint is light.

A summary of several types of scanned images and their scan results are summarized in Table 1 below.

TABLE 1

Scan results.

| | FTIR Light Source On | Direct Light Source On | FTIR and Direct Light Sources On |
|---|---|---|---|
| Real Finger | Negative Image | Positive Image | All Areas Light |
| White Paper With Black Ridges | Positive Image | Positive Image | High Contrast Positive Image |
| Clear Plastic With Black Ridges | Negative Image | No Image | Negative Image |
| Clear Plastic With | All Areas Light | Positive Image | Faint Positive |

TABLE 1-continued

Scan results.

| | FTIR Light Source On | Direct Light Source On | FTIR and Direct Light Sources On |
|---|---|---|---|
| White Ridges | Or Faint Negative | | Image Bright Background |
| Rubber Stamp | Negative Image | No Image Or Faint Positive | Faint Negative |

As shown by the scan results listed in Table 1, none of the false image techniques typically produce the same scan result as a real finger with illumination by either or both of the light sources. The scan results listed in Table 1 describe one or more threshold conditions, which if met by a combination of one or more images from different illumination sources, allows the accurate determination of whether the fingerprint is real. Therefore, the system described above can distinguish a real finger from a reproduction of a fingerprint by the unique scan results generated from different light sources.

The results listed in Table 1 are simplified. The results in Table 1, although typical, are only an example for one embodiment of the disclosed technology. It will be recognized by one of ordinary skill in the art that different embodiments of the disclosed technology may modulate of the intensity of the two light sources, vary the gain or integration time of the two images, or otherwise change the light sources to achieve an optimum level of canceling or contrast. Such adjustments may be made during testing, based on the actual implementation.

Although the entire fingerprint is typically illuminated when capturing and storing the fingerprint image, for one embodiment, an authenticity check may be performed on a small sample area of the fingerprint instead of the entire fingerprint. Either the first illumination source 105, 205 or the second illumination source 107, 207 may optionally selectively illuminate only a portion of the fingerprint. Further, only a small portion of the scanned area is necessary to determine the authenticity of a fingerprint image, which can greatly reduce the computational requirements and/or optical or mechanical complexity of the system. In one embodiment, the total scan area has dimensions of approximately 300×400 pixels with a resolution of approximately 350 dots per inch (dpi). A vertical stripe of pixels with dimensions of approximately 255×1 may optionally be considered in place of the entire image. The vertical stripe is preferably taken from approximately the middle of the image.

In one embodiment, the authenticity of a fingerprint image is determined by first illuminating the finger with the direct light source 105, 205 and capturing a first image with the imaging device 113, 213. The finger is then illuminated with the FTIR light source 107, 207 and a second image is captured with the imaging device 113, 213. For one embodiment, a difference between the first and second images is calculated by subtracting the second image from the first image on a pixel by pixel basis. Alternatively, a difference can be calculated by subtracting a portion of the second image from the same portion of the first image. For one embodiment the portion is a vertical stripe taken from the middle of the images. Alternative portions may be used for comparison. Preferably, a portion is used that is of a good quality, and not near the edges of the fingerprint. Alternatively, another method of comparing the fingerprints, overlaying the images, may be used. The difference between the two images is used to determine whether the finger is a human finger.

In another embodiment, the authenticity of a fingerprint image is determined by simultaneously illuminating the finger with the direct light source 105, 205 and the FTIR light source 107, 207.

In another embodiment, the authenticity of a fingerprint image is determined by first illuminating the finger with the direct light source 105, 205 and capturing a first image with the imaging device 113, 213. The finger is then illuminated with the FTIR light source 107, 207 and a second image is captured with the imaging device 113, 213. A difference between the two captured images may be used to determine whether the finger is a human finger.

The above implementations are simplified examples of the mathematical formulas which may be used to determine from the two sample images whether or not real skin is on the platen. Anyone skilled in the art will recognize that the subtraction operation in the preceding examples may be replaced with an addition, multiplication, dot-product, division, integration, differentiation or other operation, with similar results provided that the threshold values, gains, offset constants, decision criteria, etc. are adjusted correspondingly. It is also recognized that in order to get a clear differentiation between real and false fingers across different testing conditions, a degree of normalization of the images and/or calibration may be used.

Figure 8A:
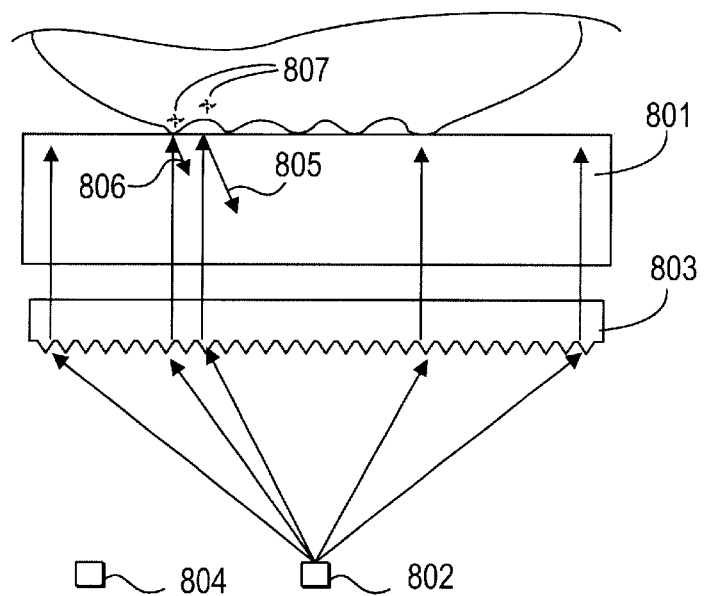
FIGS. 8A and 8B show another embodiment of a fingerprint scanning system.
Figure 8B:
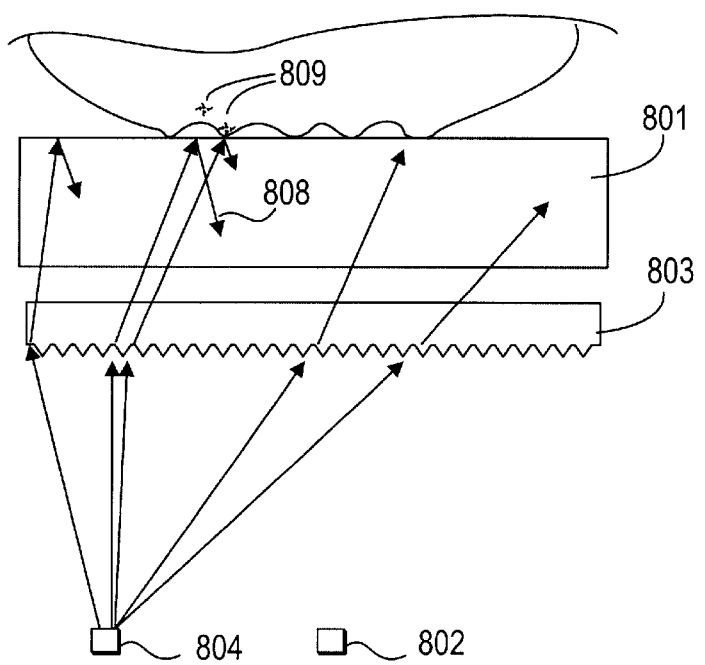

FIGS. 8A and 8B illustrate another embodiment of the fingerprint scanning system. The finger rests on a transparent platen or roller 801. Main light source 802 illuminates the platen, possibly through collimating optics 803. Optics 803 may be a lens, fresnel lens, concave mirror, or hologram. A light signal from source 802 reflects back from the platen surface toward an electronic imaging device (not shown). For one embodiment, the reflected light may pass through optics 803, or may pass through other optical components (not shown).

In the embodiment of FIG. 8, there is specular internal reflection of source 802's light on the platen surface in places with no object in contact with the platen (see ray 805). There is weaker specular reflection of 802's light in areas where skin is in contact with the platen (see ray 806), due to absorption and diffusion by the skin in contact with the platen. Additionally, there is diffuse reflection from the skin in all areas (see rays 807), however it results in a relatively weaker signal into the imager than the specular signal. Furthermore, the diffuse reflection occurs both in ridge and valley areas, so the resulting effect is relatively uniform and may appear as a small offset level on the relatively stronger specular reflection signal.

A second light source 804 is positioned at an offset from main light source 802 (see FIG. 8B) and is not on the same optical path to the imager. Due to this offset placement, specular reflection from the top surface of the platen due to light source 804 reflects at a substantial angle and therefore does not enter the input of the imaging device (see ray 808). However, source 804's light will still illuminate the skin of the finger. Furthermore, the diffuse reflection of this light off the skin (see rays 809), will still present a relatively flat signal to the imager, since diffuse reflection is multidirectional by nature.

In the embodiment of FIGS. 8A and 8B, true human skin will result in a relatively strong negative image under illumination by light source 802, a relatively weak signal under illumination by light source 804. The signal resulting from light source 804 due to human skin may be generally flat or slightly positive. Reproductions of fingerprints in the form of paper printed images or rubber stamps will generally yield relatively strong signals under both types of illumination, and the signal will tend to be of the same polarity (negative-negative, for example). Certain other types of reproductions (film images, for example) may yield very little or no signal under illumination by source 804, again being detectable as a forgery.

In the case where optics 803 is a hologram, light source 802 is positioned in the optical path for the hologram 803 to diffract the light in a direction to illuminate the platen or fingerprint for imaging. The second light source 804 is mispositioned enough from the hologram's 803 illumination axis to allow a clearly distinct output from the imaging device, one that has different characteristics when human skin or a reproduction is presented to the system.

Figure 9:
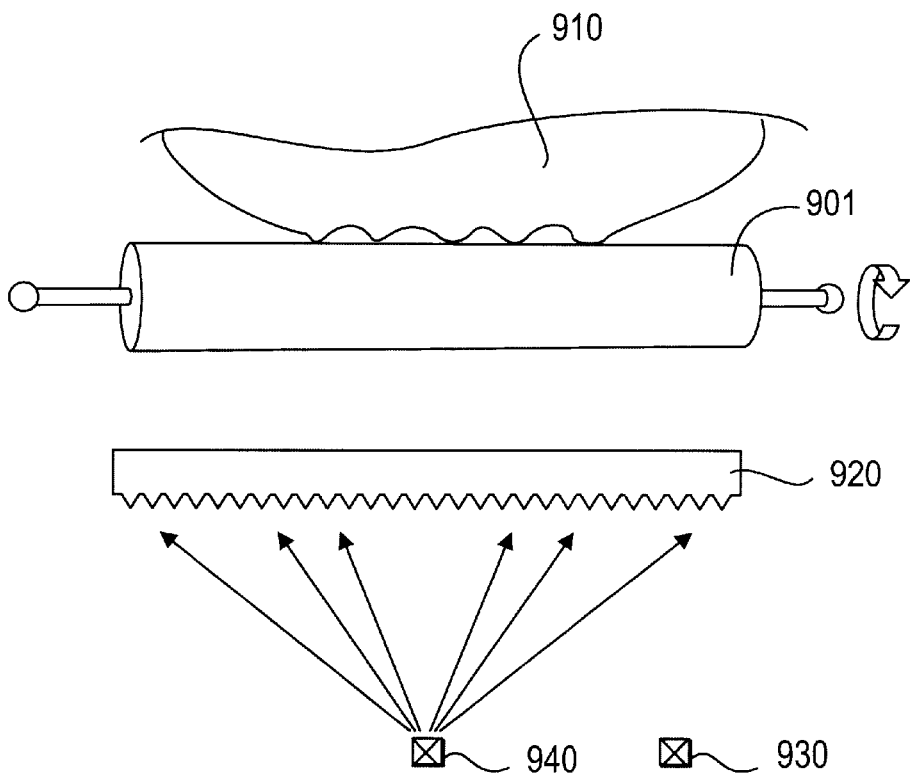
FIG. 9 shows another embodiment of a fingerprint scanning system.

It is noted that the platen 801 of FIGS. 8A and 8B may be substantially flat and rectangular in area for use with a two-dimensional area imaging device. FIG. 9 illustrates an alternative embodiment, in which the platen 901 has a relatively small width for use in capturing a stripe sample of the fingerprint with a linear array imager. Furthermore, this small width platen 901 may take the form of a roller 901, as is shown in FIG. 9.

Figure 3:
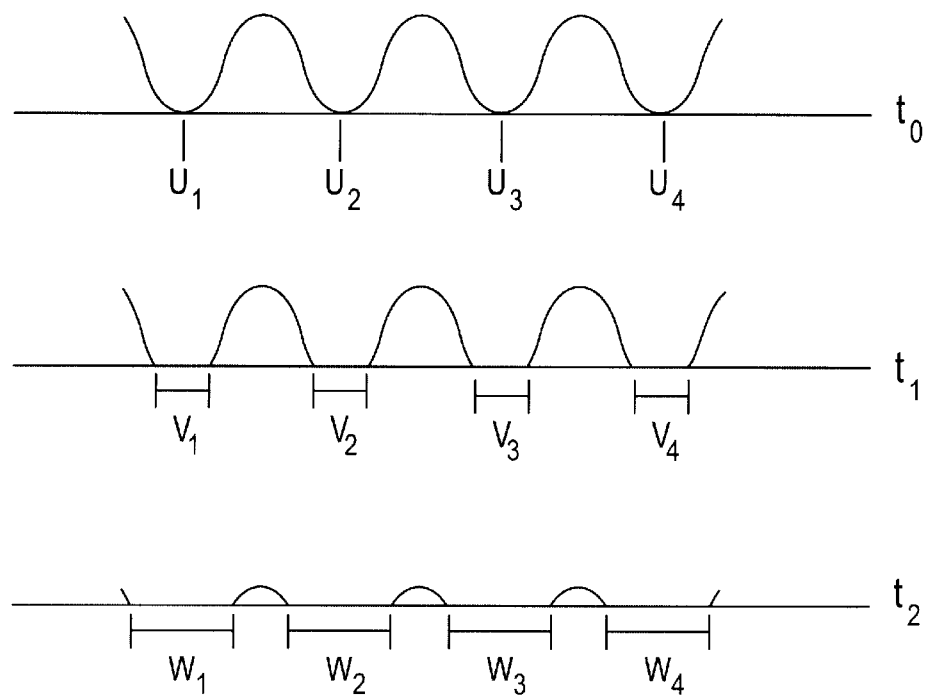
FIG. 3 shows a side view of fingerprint ridges during scanning with a fingerprint scanning system.

It is known that the fingerprint ridges on a human finger flatten out when pressure is applied to the finger, as shown in FIG. 3. At time t0, no pressure is being applied to the finger, and the width of the ridges is represented by u1, u2, u3, u4. At time t1, moderate pressure is being applied to the finger, and the width of the ridges is represented by v1, v2, v3, v4. At time t2, heavy pressure is being applied to the finger, and the width of the ridges is represented by w1, w2, w3, w4.

The system measures the change in fingerprint ridge width, and the time-varying characteristic of the change, when a finger is placed on the platen 103, 203. The finger may be sequentially illuminated by one or more light sources, and the resulting captured images compared to determine the amount of change over time.

Figure 4:
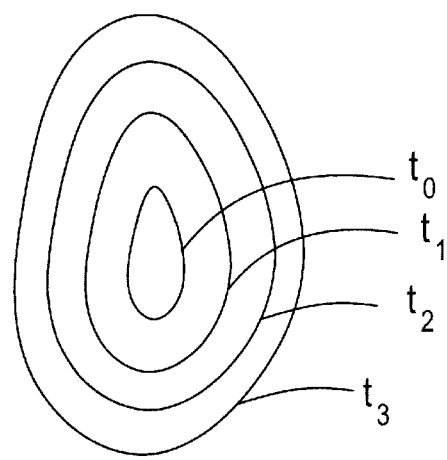
FIG. 4 shows a planar view of one embodiment of the area of a fingerprint during scanning with a fingerprint scanning system.

Because the shape of a human finger is generally rounded, the area of contact tends to increase as the finger is placed on a flat surface, as shown in FIG. 4. At time t0, when relatively little pressure is being applied to the finger, and the area of contact is generally small. As more pressure is applied to the finger, over time the area of contact increases as shown at times t1 through t3. For one embodiment, the system measures the change in the area of contact of the finger, and the time-varying characteristic of the change, when a finger is placed on the platen 103, 203. The finger may be sequentially illuminated by one or more light sources, and the resulting captured images compared to determine the change in the area of contact of the finger. A determination is made that the fingerprint is from a human finger if the difference between the area of contact of an image and the area of contact of subsequent image(s) is greater than a threshold value.

Figure 5:
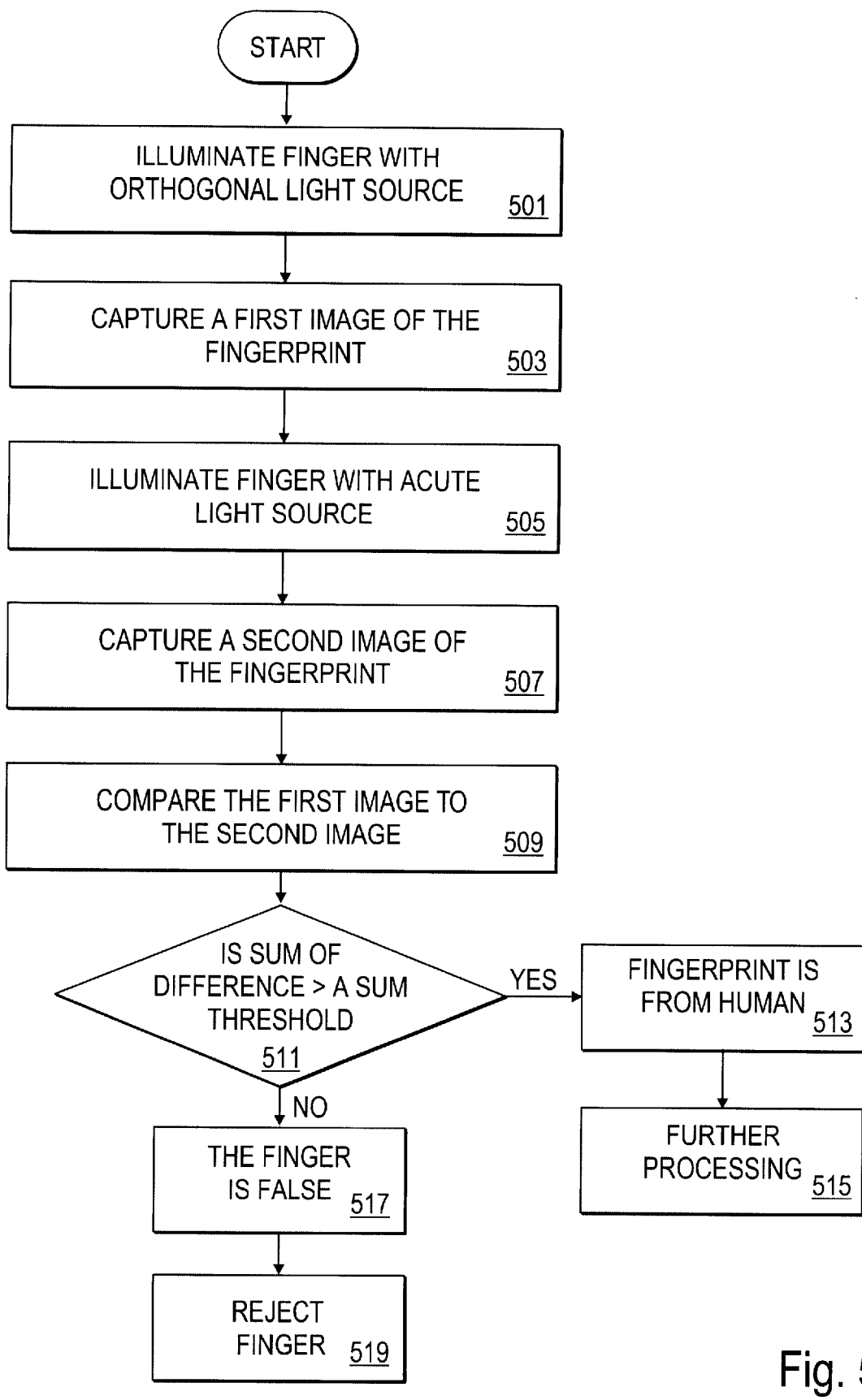
FIG. 5 is a flowchart of one embodiment of a method for distinguishing a human finger from a reproduction of a fingerprint.

FIG. 5 shows a method of distinguishing a human finger from a reproduction of a fingerprint in order to permit access only to a human finger.

At step 501, the finger is illuminated with a first light source that produces an image that shows illumination in the areas where skin is in contact with the platen and less illumination in areas where there is no skin contact. For one embodiment, this may be referred to as a positive image. Note however, that a false finger would not necessarily produce a positive image. For one embodiment, such a positive image may be produced using a direct or orthogonal light source.

At step 503, a first image of the fingerprint is captured.

At step 505, the finger is illuminated with an second light source that produces an image that shows illumination in areas where skin is not in contact with the platen and less illumination where there is skin contact. For one embodiment, this may be referred to as a negative image. Note, however, that a false finger would not necessarily produce a negative image for this type of illumination. For one embodiment, such a negative image may be produced by FTIR illumination or an acute light source.

At step 507, a second image of the fingerprint is captured.

At step 509, the first image is compared to the second image.

If at 511 the sum of a difference between the two captured images is greater than a sum threshold, at 513 a determination is made that the fingerprint is from a human finger. In that case, at 515, the finger is further processed to determine whether the user should be permitted access to the system or device secured by the fingerprint.

Otherwise, at 517, the determination is made that the fingerprint is false. In that case, at 519, the finger is rejected as a false finger.

Figure 6:
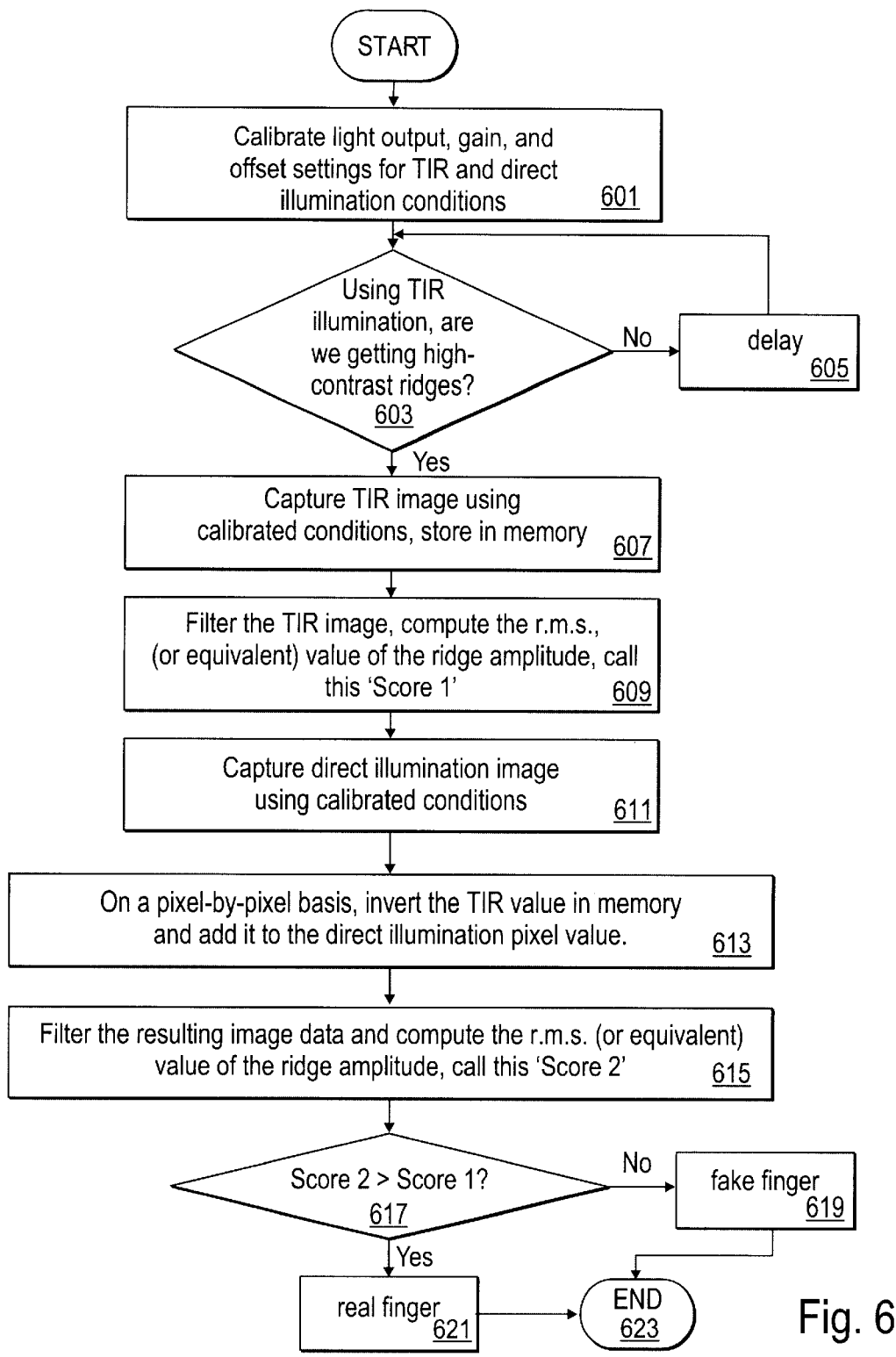
FIG. 6 is a flowchart of an alternative method for distinguishing a human finger from a reproduction of a fingerprint.

FIG. 6 is a flowchart of an alternative method for distinguishing a human finger from a reproduction of a fingerprint. The process starts at block 600, when a fingerprint is placed on a sensor.

At 601, the system is calibrated. For one embodiment, this step includes calibrating the light output, gain, and offset settings for TIR and direct illumination conditions. The process of calibration is known in the art.

At 603, the system determines whether or not high contrast ridges are obtained or not.

If no high contrast ridges are detected at 603, the process delays at 605, and returns to 603 to test again. For one embodiment, after a period of time the system times out, and a new session is initiated. If high contrast ridges are detected at 603, the process continues to 607.

At 607 a total internal reflection (TIR) or frustrated TIR image is captured using calibrated conditions, an the image is stored in memory.

At 609 the TIR images is processed. For one embodiment, processing comprises filtering, amplifying and/or normalizing the TIR image. For one embodiment, the root-mean-square (RMS) or equivalent value of the ridge amplitude is calculated, and this value is designated Score 1. Alternative and additional processing steps may be taken.

At 611 a direct illumination image is captured using the calibrated conditions. For one embodiment, the calibration step at 601 calibrates for both TIR and direct illumination lighting separately. Alternatively, calibrating for TIR illumination is sufficient to produce calibrated images by direct illumination.

At 613 on a pixel-by-pixel basis, the TIR value is inverted in memory, and added to the direct illumination pixel value.

At 615 this resulting image is processed. Processing may include filtering, amplifying, and/or normalizing the image data. For one embodiment, the RMS or equivalent value of the ridge amplitude may be calculated, and this value is designated Score 2.

If at 617 Score 2 is greater than Score 1, at 621 it is determined that the finger is a real finger. If at 617 Score 2 is not greater than Score 1, at 619 it is determined that the finger is a fake finger. The process subsequently ends at 623. For one embodiment, additional processing may take place at this point if the finger is a real finger, and alerts or other actions may be taken if the finger is found to be a fake finger.

Figure 7:
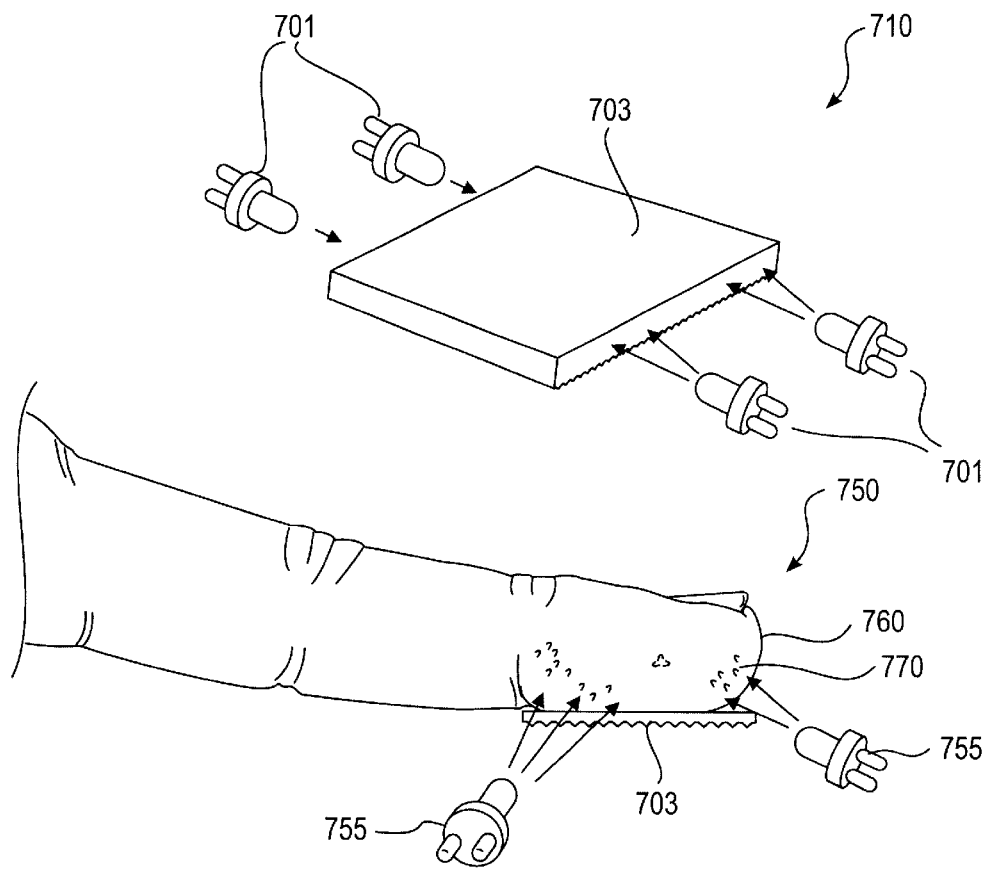
FIG. 7 shows another embodiment of a fingerprint scanning system.

FIG. 7 shows another embodiment of a fingerprint scanning system. The first view 710 shows a direct light source 701 being a side light in the platen 703. The direct light source 701 may be positioned on both sides of the platen 703, to illuminate the platen 703. Images of a fingerprint on the platen 703 when the direct light source 701 is on are positive images.

The second view 750 shows scattering light source 755 illuminating the finger 760 directly. Human skin produces light scattering 770 in a particular manner. Thus, the image obtained when the finger 760 on the platen 703 is illuminated by scattering light source 755 is a negative image. These two images may be compared, as described above, to determine whether the finger is a human finger.

For one embodiment, the light can be illuminated only by scattering light source 755 with no second image. The scattering of light 770 due to blood and flesh is characteristic of a real finger. For one embodiment, an upper and lower threshold are stored in the sensor, and if the scattering of light 770 is between the thresholds set for a live finger, the finger is determined to be a human finger.

Note that the light sources described above may be visible light, infrared light, or another form of light. The actual wavelength of the light used may vary in any safe range (e.g. above X-ray and below microwave). Further note that although the specific implementation described as an example is that of a fingerprint, one skilled in the art would understand how to extend this methodology to other body parts, such as palms, hands, eyes, etc.

While the invention is described in terms of exemplary embodiments in a specific system environment, those of ordinary skill in the art will recognize that the invention can be practiced, with modification, in other and different hardware and software environments within the spirit and scope of the appended claims.

What is claimed is:

1. An apparatus for scanning a fingerprint comprising:
   a first light positioned to generate a first image showing illumination in areas where skin is in contact with a platen and showing less illumination in areas where no skin is in contact with the platen;
   a second light source positioned to generate a second image showing illumination in areas where no skin is in contact with the platen and showing less illumination in areas where skin is in contact with the platen;
   an imaging device positioned to capture an image of the fingerprint illuminated by light from either the first light source or the second light source; and
   a comparison logic for determining if the fingerprint is from a human finger if a mathematical comparison between the first image and the second image meets or exceeds a predetermined criteria.

2. The apparatus of claim 1 wherein the first light is positioned orthogonal to the platen.

3. The apparatus of claim 2, wherein the platen is a substantially rectangular platen, and wherein the first light is positioned to illuminate the platen from a side.

4. The apparatus of claim 1, wherein the platen comprises a platen having a microprism array.

5. The apparatus of claim 1, wherein the first light is positioned to illuminate both the ridges and valleys of the fingerprint, the scattered light from the first light yielding a low- or zero-contrast image of skin, and a higher contrast image of a reproduction fingerprint.

6. The apparatus of claim 1, wherein the platen is a roller for receiving a user's fingerprint.

7. The apparatus of claim 1 wherein the second light provides frustrated total internal reflection (FTIR) light.

8. The apparatus of claim 1 further comprising a focusing device positioned to focus light reflected from the platen onto the imaging device.

9. The apparatus of claim 8 wherein the focusing device comprises a device selected from the following: a lens, fresnel lens, concave mirror, and a hologram.

10. The apparatus of claim 1 wherein the first light source comprises a light-emitting diode (LED).

11. The apparatus of claim 1 wherein the second light source comprises a light-emitting diode (LED).

12. The apparatus of claim 1 wherein the imaging device comprises a device selected from among the following: a charge-coupled device (CCD); a complementary metal-oxide semiconductor (CMOS) image sensor; a contact image sensor (CIS).

13. The apparatus of claim 1 further comprising a prism positioned between the platen and the imaging device.

14. A method for determining if a fingerprint is from a human finger, the method comprising:
   capturing with an imaging device a first image of the fingerprint illuminated by a first light source;
   capturing with the imaging device a second image of the fingerprint illuminated by a second light source;
   determining that the fingerprint is from a human finger if a mathematical comparison between the first image and the second image meets or exceeds a predetermined criteria.

15. The method of claim 14, wherein
   the first light is positioned to generate a first image showing illumination in areas where skin is in contact with the platen and showing less illumination in areas where no skin is in contact with the platen; and
   the second light source is positioned to generate a second image showing illumination in areas where no skin is in contact with the platen and showing less illumination in areas where skin is in contact with the platen.

16. The method of claim 15, wherein the first light is positioned to illuminate both the ridges and valleys of the fingerprint, the scattered light from the first light yielding a low- or zero-contrast image of skin, and a higher contrast image of a reproduction fingerprint.

17. The method of claim 16, wherein the platen is a roller.

18. The method of claim 16, wherein capturing the fingerprint image further comprises using a hologram to reflect the light.

19. The method of claim 14, wherein
   the first light source directs light substantially orthogonal to the platen; and
   the second light source directs light at an acute angle to the platen.

20. The method of claim 14, wherein the first image is captured at a first instant and the second image is captured at a second instant.

21. The method of claim 20, wherein determining comprises:
   determining that the fingerprint is from a human finger if the difference between the width of a ridge on the first image and the width of the ridge on the second image is greater than a flattening threshold value.

22. The method of claim 20, wherein determining comprises:
  determining that the fingerprint is from a human finger if the difference between the area of contact of the first image and the area of contact of the second image is greater than a contact area threshold value.

23. A method for determining if a fingerprint is from a human finger placed on a platen, the method comprising:
  illuminating the finger with a first light source positioned to direct light substantially orthogonal to the platen;
  illuminating the finger with a second light source positioned to direct light at an acute angle to the platen;
  capturing with an imaging device an image of the fingerprint illuminated by the first light source and the second light source; and
  determining that the fingerprint is from a human finger if the difference between a light intensity of a ridge of the fingerprint and a light intensity of a valley of a fingerprint is less than a contrast threshold value.

24. A method for determining if a fingerprint is from a human finger placed on a platen, the method comprising:
  illuminating the finger with a first light source positioned to direct light substantially orthogonal to the platen;
  capturing with an imaging device a first image of the fingerprint illuminated by the first light source;
  illuminating the finger with a second light source positioned to direct light at an acute angle to the platen;
  capturing with the imaging device a second image of the fingerprint illuminated by the second light source;
  comparing the first image to the second image; and
  determining that the fingerprint is from a human finger if lighter areas of the first image generally correspond to darker areas of the second image, and vice versa.

25. A method for determining if a fingerprint is from a human finger placed on a platen, the method comprising:
  illuminating the finger with light from a light source;
  capturing with an imaging device a first image of the fingerprint at a first time instant;
  capturing with the imaging device a second image of the fingerprint at a second time instant;
  comparing the first image to the second image; and
  determining that the fingerprint is from a human finger if the difference between the width of a ridge on the first image and the width of the ridge on the second image is greater than a widening threshold value.

26. A method for determining if a fingerprint is from a human finger placed on a platen, the method comprising:
  illuminating the finger with light from a light source;
  capturing with an imaging device a first image of the fingerprint at a first time instant;
  capturing with the imaging device a second image of the fingerprint at a second time instant;
  comparing the first image to the second image; and
  determining that the fingerprint is from a human finger if the difference between the area of contact of the first image and the area of contact of the second image is greater than a threshold value.

* * * * *